United States Patent [19]

Uenaka et al.

[11] Patent Number: 5,468,813

[45] Date of Patent: Nov. 21, 1995

[54] POWDER COATING

[75] Inventors: Akimitsu Uenaka, Suita; Yuji Toyoda, Neyagawa; Koichi Tsutsui, Kyoto; John Kenny, Neyagawa, all of Japan

[73] Assignee: Nippon Paint Co., Ltd., Japan

[21] Appl. No.: 332,744

[22] Filed: Nov. 1, 1994

[30] Foreign Application Priority Data

Nov. 11, 1993 [JP] Japan ................................. 5-307153

[51] Int. Cl.$^6$ ........................................................ C08F 8/00

[52] U.S. Cl. ...................... 525/385; 525/124; 525/327.3; 525/328.8; 525/329.7; 525/384; 525/386; 525/449

[58] Field of Search ...................... 525/385, 386, 525/449

[56] References Cited

U.S. PATENT DOCUMENTS

| | | | |
|---|---|---|---|
| 4,156,040 | 5/1979 | Swiden et al. | 427/226 |
| 4,268,542 | 5/1981 | Sakakibara et al. | 427/195 |
| 4,375,498 | 3/1983 | LeMinez et al. | 428/416 |
| 4,981,759 | 1/1991 | Makatani et al. | 428/626 |
| 4,997,907 | 3/1991 | Marten et al. | 525/449 |
| 5,034,432 | 7/1991 | Ueno et al. | 523/206 |
| 5,379,947 | 1/1995 | Williams et al. | 244/21 |

*Primary Examiner*—Bernard Lipman
*Attorney, Agent, or Firm*—Pollock, Vande Sande & Priddy

[57] ABSTRACT

The object of the present invention is to provide a powder coating excellent in storage stability and in coat surface smoothness.

The present invention relates to a powder coating comprising a binder resin and a curing agent, characterized in that said curing agent has particle size characteristics such that the average particle size is 0.3 to 7 μm and particles having a particle size not smaller than 20 μm account for not less than 10% by weight of all curing agent particles.

14 Claims, No Drawings

POWDER COATING

FIELD OF THE INVENTION

The present invention relates to a powder coating excellent in coat film smoothness.

BACKGROUND OF THE INVENTION

The technology of coating substrates with a coating material has advanced in the fields of automotive parts, domestic electric appliances, building materials and the like for the purpose of rust prevention, coloration, brightening and so forth. In such coating, the substrate surface is generally subjected to the steps of under coating, intermediate coating, top coating, and the like to give a finished product. Among coating materials used for these coating steps, powder coatings in which no organic solvent is used are free of the risk of environmental pollution and give a good coat film appearance within a short curing time and, accordingly, they have been widely used in recent years.

Such powder coatings are produced, for instance, by admixing a thermosetting resin serving as a binder resin with a curing agent, a pigment and other additives, melting and kneading the mixture under conditions such that the crosslinking of resin molecules will not substantially proceed, extruding the same in the form of pellets and pulverizing the latter.

The thus-produced powder coatings are applied to substrates by such means as electrostatic spray coating or fluidized dipping method, followed by a baking step to give coat films.

However, the conventional powder coatings tend to readily undergo partial curing during the period between powder coating production and application and thus few are fully satisfactory from the storage stability viewpoint. Furthermore, only a small proportion of finished coat films have satisfactory coat film characteristics, in particular smoothness, luster, gloss, and the like.

In view of the foregoing, it is an object of the present invention to provide a powder coating excellent in storage stability and in coat surface smoothness.

SUMMARY OF THE INVENTION

The gist of the invention lies in that, in a powder coating comprising a binder resin and a curing agent, the particle size characteristics of said curing agent are adjusted such that the average particle size is 0.3 to 7 μm and particles not less than 20 μm in particle size account for not more than 10% by weight.

DETAILED DESCRIPTION OF THE INVENTION

The powder coating of the present invention comprises a binder resin and a curing agent.

The above-mentioned binder resin is not limited to any particular species but includes, for example, normally solid polymers, oligomers and polyfunctional low-molecular-weight compounds of the acrylic, polyester or epoxy type, for instance, that contain glycidyl, epoxy, carboxyl, hydroxyl, alkoxymethylol and other functional groups.

Preferred among them are glycidyl- or carboxyl-containing polymers, for example acrylic resins and polyester resins.

The curing agent to be used in the practice of the present invention has an average particle size of 0.3 to 7 μm. When the average particle size is less than 0.3 μm, the cohesion of the curing agent may not easily become disentangled at the time of production, and the smoothness of coat films after application may become poor. When the average particle size exceeds 7 μm, the state of mixing of the binder resin and curing agent becomes poor, hence coat films with good smoothness cannot be obtained any longer in the steps of application and baking of the powder coating in the early stage of production thereof. A more preferred average particle size is within the range of 1 to 6 μm.

In the curing agent to be used in accordance with the present invention, particles not less than 20 μm in particle size account for not more than 10% by weight of all particles.

When particles not less than 20 μm in particle size account for more than 10% by weight of all particles, the curing agent is poorly dispersed in the binder resin; as a result, coat films with good smoothness cannot be obtained any longer in the steps of application and baking of the powder coating in the early stage of production thereof. More preferably, such particles should account not more than 9% by weight of all particles.

The particle size characteristics of the curing agent as mentioned above can be attained by adjusting, in the step of grinding the curing agent in a pulverizer, the time of grinding, method of grinding and other factors and, when necessary, performing the grinding in association with a classification procedure. Pulverizers suited for use are jet mills, high speed tumbling mills and the like. Pulverization can be effected while suitably selecting the pulverizer depending on the softening point, melting point and glass transition point of the curing agent and other factors.

The particle size characteristics of the curing agent mentioned above can be calculated on the basis of measurements by the laser diffraction scattering method.

The curing agent mentioned above is not limited to any particular species provided that it is a polyfunctional compound capable of suitably forming crosslinks among binder resin molecules at the baking temperature.

As examples, there may be mentioned polybasic carboxylic acids, polyglycidyl compounds, acid anhydrides, polyhydric phenols, polyfunctional amines, blocked isocyanates, N-acyllactams, N-acylimides, oxazoline compounds, derivatives of these, polyester resins, polyacrylic resins, epoxy resins, melamine resins and like functional group-containing polymers and oligomers.

When a glycidyl group-containing or carboxyl group-containing compound is used as the binder resin mentioned above, it is desirable to use, among the curing agents listed above, a polybasic carboxylic acid or a polyglycidyl compound, respectively.

The polybasic carboxylic acid mentioned above is not limited to any particular species but includes, among others, adipic acid, pimelic acid, suberic acid, azelaic acid, sebacic acid, 1,10-decanedicarboxylic acid, 1,12-dodecanedicarboxylic acid, 1,20-eicosanedicarboxylic acid, citric acid, maleic acid, citraconic acid, itaconic acid, glutaconic acid, phthalic acid, isophthalic acid, hexahydrophthalic acid, cyclohexene-1,2-dicarboxylic acid and like polybasic carboxylic acids.

The polyglycidyl compound mentioned above is not limited to any particular species but mention may be made of triglycidyl isocyanurate and substitution derivatives or other derivatives thereof.

When such a polybasic carboxylic acid as mentioned above is used as the curing agent mentioned above, it is used preferably at an addition level of 10 to 40 parts by weight per 100 parts by weight of the binder resin mentioned above. When the polybasic carboxylic acid is used in an amount less than 10 parts by weight, a sufficient level of curing as a coating cannot be attained while, in an amount exceeding 40 parts by weight, its dispersion in the binder resin becomes insufficient, resulting in a deteriorated coat film appearance. A more preferred amount lies within the range of 20 to 35 parts by weight.

When such a polyglycidyl compound as mentioned above is used as the curing agent mentioned above, it is used preferably in an addition level of 5 to 30 parts by weight per 100 parts by weight of the binder resin mentioned above. When the polyglycidyl compound is used in an amount less than 5 parts by weight, a sufficient level of curing as a coating cannot be attained while, in an amount exceeding 30 parts by weight, its dispersion in the binder resin becomes insufficient, resulting in a deteriorated coat film appearance. A more preferred amount lies within the range of 7 to 20 parts by weight.

As desired, at least one pigment and other additive may be incorporated in the powder coating of the present invention.

The pigment mentioned above is not limited to any particular species but includes inorganic and organic pigments, for example, titanium dioxide, red iron oxide, yellow iron oxide, carbon black, phthalocyanine blue, phthalocyanine green, red quinacridone pigments, and the like.

The other additive mentioned above is not limited to any particular species but includes, among others, surface modifiers such as polysiloxanes and polyalkylacrylates, plasticizers, ultraviolet absorbers, antioxidants, foaming inhibitors such as benzoin, pigment dispersing agents, and curing catalysts such as amine compounds, imidazole compounds, cation initiators, and the like.

For improving or modifying the coatability and coat film performance characteristics of the powder coating of the present invention, said coating powder may be blended with one or more of various natural resins, synthetic resins, elastomers and the like.

For the production of the powder coating of the present invention, all processes, apparatus and so on that are conventional in the art can be used. The most general process comprises admixing raw materials preliminarily, then melt-mixing the same and pulverizing and classifying the mixture. It is also possible, in certain instances, to mix up the compound in the state of suspension, emulsion or solution and then subjecting the mixture to spray drying to give a powder.

The powder coating of the present invention has a volume-average particle size of 5 to 50 μm, preferably 8 to 40 μm. In cases where the average particle size is 5 to 20 μm, the proportion of particles not more than 5 μm in size should more preferably be not more than 25% by weight. In cases where the average particle size is 20 to 50 μm, the standard deviation of the particle size distribution should more preferably be not more than 20 μm.

The standard deviation of particle size distribution is defined by $[\Sigma\{(D-X)^2 F\}/\Sigma F]^{1/2}$, where X denotes the volume-average particle size and is defined as $X=\Sigma(DF)/\Sigma F$, and F denotes the frequency of particles.

The method of applying the powder coating of the present invention is not limited in any particular sense but may be any of the known conventional methods, for example the electrostatic spray coating method, the fluidized dipping method and other methods.

The substrate to be coated with the powder coating according to the present invention is not limited to any particular species but may be any material provided that it can endure baking. There may be mentioned various materials, for example, steel plates, zinc phosphated steel plates, aluminum plates, coat films, and the like.

It is also possible to apply the powder coating of the present invention overlappingly to a coat layer of the same or a different coating material and then subject both coatings to simultaneous baking.

EXAMPLES

The following production examples, working examples and comparative examples are further illustrative of the present invention but are by no means limitative of the scope of the present invention.

Production Example 1. Synthesis of a binder resin (resin 1)

A reaction vessel was charged with 63 weight parts of xylene, the charge was heated to 130° C. and then, in a nitrogen atmosphere, the following raw materials (A) and (B) were added dropwise separately over 3 hours.

| (A) | Glycidyl methacrylate | 45 weight parts |
|---|---|---|
| | Styrene | 20 weight parts |
| | Methyl methacrylate | 27 weight parts |
| | Isobutyl methacrylate | 8 weight parts |
| (B) | tert-Butyl peroctoate | 7 weight parts |

After heating for 30 minutes, 1 weight part of tert-butyl peroctoate was added dropwise over 30 minutes and then the resultant mixture was heated for 1 hour. The solvent was then distilled off under reduced pressure at 130° C. to give resin 1.

Production Example 2. Synthesis of a binder resin (resin 2)

A reaction vessel was charged with 63 weight parts of xylene, the charge was heated to 130° C. and then, in a nitrogen atmosphere, the following raw materials (A) and (B) were added dropwise separately over 3 hours.

| (A) | Acrylic acid | 5.1 weight parts |
|---|---|---|
| | Styrene | 20.0 weight parts |
| | Methyl methacrylate | 26.7 weight parts |
| | Isobutyl methacrylate | 33.2 weight parts |
| | Ethyl acrylate | 15.0 weight parts |
| (B) | tert-Butyl peroctoate | 7.0 weight parts |

After heating for 30 minutes, 1 weight part of tert-butyl peroctoate was added dropwise over 30 minutes and then the resultant mixture was heated for 1 hour. The solvent was then distilled off under reduced pressure at 130° C. to give resin 2.

Production Example 3. Preparation of curing agent samples (I) A curing agent sample (I-C) was prepared by feeding decane-dicarboxylic acid (Ube Industries) to a jet mill (labo jet mill with classifying function; Nippon Pneumatic) used as a pulverizer and operated under conditions such that the air pressure was 7 kg/cm² and the number of classification stages was 3. For comparison, pulverized samples (I-A, I-B, I-D, I-E, I-F) were prepared while varying the operating conditions. The particle size characteristics of the samples thus prepared are shown in Table 1.

For determining the particle size characteristics of each pulverized sample, the sample was dispersed in advance in 15 ml of water by 1 minute of sonication and then the laser diffraction scattering method (Microtrac MKIISA; Leeds & Northrup) was used.

(II) Triglycidyl isocyanurate was pulverized and classified by the same method as used above in (I) for preparing the pulverized decanedicarboxylic acid samples, to give a pulverized sample (I-C) and pulverized samples for comparison (II-A, II-B, II-D, II-E, II-F). The particle size characteristics of these are shown in Table 2.

[TABLE 1]

|  | I-A | I-B | I-C | I-D | I-E | I-F |
|---|---|---|---|---|---|---|
| Average particle size (μm) | 8.0 | 5.0 | 5.0 | 8.0 | 0.1 | 2.0 |
| Particles not less than 20 μm in size (weight %) | 17 | 17 | 6 | 7 | 0 | 1 |

[TABLE 2]

|  | II-A | II-B | II-C | II-D | II-E | II-F |
|---|---|---|---|---|---|---|
| Average particle size (μm) | 8.0 | 5.0 | 5.0 | 8.0 | 0.1 | 2.0 |
| Particles not less than 20 μm in size (weight %) | 15 | 16 | 5 | 7 | 0 | 1 |

Example 1

A compound composed of 100 weight parts of resin 1, 29.1 weight parts of I-C, 0.3 weight part of a polysiloxane-based surface modifier (YF-3919; Toshiba Silicone) and 0.6 weight part of benzoin was mixed, then melted and kneaded in a Bussco kneader (Buss) and pulverized and classified (150 mesh) to give a powder coating. This coating material was applied to an iron plate (0.8 mm thick) having an intermediate coat, to a coat thickness of 80 μm using an electrostatic coating device (Sames) and the coat was baked at 150° C., for 25 minutes. The baked coat was tested for performance evaluation. The results obtained are shown in Table 3. NSIC* measurement was made using a portable image sharpness measuring device (Suga Shikenki). Within the range of the examples and comparative examples where the curing agents were of the same kind, the initial smoothness was substantially at the same level irrespective of particle size (distribution).

Examples 2 to 5 and Comparative Examples 1 to 10

The same test and evaluation as in Example 1 were repeated except that the composition was varied as shown in Table 3 and Table 4. The results thus obtained are shown in Table 3 and Table 4.

[TABLE 3]

|  |  | Example 1 | Example 2 | Example 3 | Compar. Example 1 | Compar. Example 2 | Compar. Example 3 | Compar. Example 4 | Compar. Example 5 |
|---|---|---|---|---|---|---|---|---|---|
| Composition (weight parts) | Resin 1 | 100 | 100 | 100 | 100 | 100 | 100 | 100 | 100 |
|  | I-A | — | — | — | 29.1 | — | — | — | — |
|  | I-B | — | — | — | — | 29.1 | — | — | — |
|  | I-C | 29.1 | — | 19.0 | — | — | — | — | — |
|  | I-D | — | — | — | — | — | 29.1 | — | 19.0 |
|  | I-E | — | — | — | — | — | — | 29.1 | — |
|  | I-F | — | 29.1 | — | — | — | — | — | — |
|  | Benzoin | 0.6 | 0.6 | 0.6 | 0.6 | 0.6 | 0.6 | 0.6 | 0.6 |
|  | Surface modifier | 0.3 | 0.3 | 0.3 | 0.3 | 0.3 | 0.3 | 0.3 | 0.3 |
| NSIC* |  | 62 | 68 | 62 | 25 | 52 | 27 | 60 | 48 |
| Influence of particle size characteristics of curing agent on coat film performance |  | Average particle size and particle size distribution both agreeing with particle size characteristics of invention, storage stability and NSIC* were both good. | Average particle size and particle size distribution both agreeing with particle size characteristics of invention, storage stability and NSIC* were both good. | Average particle size and particle size distribution both agreeing with particle size characteristics of invention, storage stability and NSIC* were both good. | Average particle size being large and proportion of particles not less than 20 μm in size being high, coat film smoothness was poor and NSIC* was considerably low. | Proportion of particles not less than 20 μm in size being high, coat film smoothness was affected and NSIC* was considerably low. | Average particle size being too large, coat film smoothness resulted and NSIC* was low. | Average particle size being too small, poor dispersion resulted and NSIC* was low. | Average particle size being too large, coat film smoothness was affected and NSIC* was low. |

[TABLE 4]

| | | Example 4 | Example 5 | Example 6 | Compar. Example 6 | Compar. Example 7 | Compar. Example 8 | Compar. Example 9 | Compar. Example 10 |
|---|---|---|---|---|---|---|---|---|---|
| Composition (weight parts) | Resin 2 | 100 | 100 | 100 | 100 | 100 | 100 | 100 | 100 |
| | II-A | — | — | — | 9 | — | — | — | — |
| | II-B | — | — | — | — | 9 | — | — | — |
| | II-C | 9 | — | 6 | — | — | — | — | — |
| | II-D | — | — | — | — | — | 9 | — | 6 |
| | II-E | — | — | — | — | — | — | 9 | — |
| | II-F | — | 9 | — | — | — | — | — | — |
| | Benzoin | 0.5 | 0.5 | 0.5 | 0.5 | 0.5 | 0.5 | 0.5 | 0.5 |
| | Surface modifier | 0.25 | 0.25 | 0.25 | 0.25 | 0.25 | 0.25 | 0.25 | 0.25 |
| NSIC* | | 62 | 61 | 55 | 20 | 45 | 22 | 52 | 45 |
| Influence of particle size characteristics of curing agent on coat film performance | | Average particle size and particle size distribution both agreeing with particle size characteristics of invention, storage stability and NSIC* were both good. | Average particle size and particle size distribution both agreeing with particle size characteristics of invention, storage stability and NSIC* were both good. | Average particle size and particle size distribution both agreeing with particle size characteristics of invention, storage stability and NSIC* were both good. | Average particle size being large and proportion of particles not less than 20 μm in size being high, coat film smoothness was poor and NSIC* was considerably low. | Proportion of particles not less than 20 μm in size being high, coat film smoothness was affected and NSIC* was considerably low. | Average particle size being too large, coat film smoothness was affected and NSIC* was low. | Average particle size being too small, poor dispersion resulted and NSIC* was low. | Average particle size being too large, coat film smoothness was affected and NSIC* was low. |

As described above, the powder coating of the present invention, with the constitution mentioned above, can improve the storage stability and coat film smoothness.

We claim:

1. A powder coating comprising a binder resin and a curing agent, characterized in that said curing agent has particle size characteristics such that the average particle size is 0.3 to 7 μm and particles having a particle size not smaller than 20 μm account for not more than 10% by weight of all curing agent particles.

2. The powder coating as claimed in claim 1, wherein said curing agent comprises a polybasic carboxylic acid or polyglycidyl compound.

3. The powder coating as claimed in claim 2 which comprises 100 parts by weight of the binder resin and 20 to 35 parts by weight of the polybasic carboxylic acid.

4. The powder coating as claimed in claim 2 which comprises 100 parts by weight of the binder resin and 7 to 20 parts by weight of the polyglycidyl compound.

5. The powder coating of claim 1 wherein said particles having a particle size not smaller than 20 μm account for not more than 9% by weight of all curing agent particles.

6. The powder coating of claim 1 wherein said binder resin contains glycidyl group or carboxyl group.

7. The powder coating of claim 2 which comprises 100 parts by weight of the binder resin and 10 to 40 parts by weight of the polybasic carboxylic acid.

8. The powder coating of claim 2 which comprises 100 parts by weight of the binder resin and 5 to 30 parts by weight of the polyglycidyl compound.

9. The powder coating of claim 1 wherein said binder resin is selected from the group consisting of acrylic, polyester and epoxy and containing functional groups selected from the group consisting of glycidyl, epoxy, carboxyl, hydroxyl and alkoxymethylol.

10. The powder coating of claim 6 wherein said binder resin is an acrylic resin or polyester resin.

11. The powder coating of claim 1 wherein binder resin comprises a glycidyl group containing acrylic resin and said curing agent comprises a polybasic carboxylic acid.

12. The powder coating of claim 11 wherein said polybasic carboxylic acid is selected from the group consisting of adipic acid, pimelic acid, suberic acid, azelaic acid, sebacic acid, 1,10-decanedicarboxylic acid, 1,12-dodecanedicarboxylic acid, 1-20-eicosanedicarboxylic acid, citric acid, maleic acid, citraconic acid, itaconic acid, glutaconic acid, phthalic acid, isophthalic acid, hexahydrophthalic acid, and cyclohexene-1,2-dicarboxylic acid.

13. The powder coating of claim 1 having a volume-average particle size of 5 to 50 μm.

14. The powder coating of claim 1 having a volume-average particle size of 8 to 40 μm.

* * * * *